(12) United States Patent
McKinstrie et al.

(10) Patent No.: US 7,164,526 B2
(45) Date of Patent: Jan. 16, 2007

(54) PARAMETRIC AMPLIFICATION USING TWO PUMP WAVES

(75) Inventors: Colin J. McKinstrie, Manalapan, NJ (US); Stoian Radic, Solana Beach, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 132 days.

(21) Appl. No.: 11/068,555

(22) Filed: Feb. 28, 2005

(65) Prior Publication Data

US 2005/0146780 A1 Jul. 7, 2005

Related U.S. Application Data

(63) Continuation-in-part of application No. 10/232,082, filed on Aug. 30, 2002, now abandoned.

(51) Int. Cl.
G02F 1/39 (2006.01)
H03F 7/00 (2006.01)

(52) U.S. Cl. .................................. 359/330; 330/4.5
(58) Field of Classification Search ........ 359/326–330; 330/4.5
See application file for complete search history.

(56) References Cited

U.S. PATENT DOCUMENTS 3,617,912 A * 11/1971 Miller .................. 330/4.6
4,349,907 A   9/1982 Campillo et al. ............. 372/92
5,386,314 A   1/1995 Jopson .................. 359/326
5,771,117 A   6/1998 Harris et al. .............. 359/326

OTHER PUBLICATIONS

I. Tomkos et al, "Performance Of A Reconfigurable Wavelength Converter Based On Dual-Pump-Wave Mixing In A Semiconductor Optical Amplifier", IEEE Photonics Technology Letters, vol. 10, No. 10, Oct. 1998, pp. 1404-1406.*

"Applications of Nonlinear Fiber Optics," Govinda P. Agrawal, Nonlinear Fiber Optics, Third Edition, Optics and Photonics, Academic Press, pp. 40-41, 164-165, 388-393.

* cited by examiner

*Primary Examiner*—John D. Lee

(57) ABSTRACT

An optical parametric amplifier (OPA) driven with at least two pump waves. The pump waves may be configured such that the OPA produces uniform exponential gain over a range of wavelengths that extends, for example, at least 30 nm on either side of the average pump-wave wavelength. In addition, since the Brillouin scattering limit applies to each pump wave independently, substantially twice the amount of energy may be pumped into an OPA of the present invention compared to that in the corresponding single pump-wave OPA of the prior art. An OPA of the present invention may be used in a WDM communication system and configured for simultaneous signal amplification and wavelength conversion.

20 Claims, 11 Drawing Sheets

PARAMETRIC AMPLIFICATION USING TWO PUMP WAVES

CROSS-REFERENCE TO RELATED APPLICATIONS

This application is a continuation-in-part (CIP) of U.S. patent application Ser. No. 10/232,082, filed Aug. 30, 2002, now abandoned the teachings of which are incorporated herein by reference.

BACKGROUND OF THE INVENTION

1. Field of the Invention

The present invention relates to optical communication equipment.

2. Description of the Related Art

Optical communication systems employ optical amplifiers, e.g., to compensate for signal attenuation in optical fibers. One type of amplifier that may be used in a fiber-based optical communication system is an optical parametric amplifier (OPA). As known in the art, an OPA is a device that produces a tunable coherent optical output via nonlinear optical processes, in which, typically, one or two pump-wave photons are converted into two new photons with conservation of photon energy and momentum. The waves corresponding to the two new photons are usually referred to as a signal wave and an idler wave, respectively. In an OPA, noise levels at the input and the output are comparable and the idler wave is a phase conjugate of the signal wave.

FIG. 1 shows a representative OPA 100 of the prior art that is configured for use in a long-haul transmission line of an optical communication system. OPA 100 is coupled between two sections 102 and 102' of a long-haul optical fiber. OPA 100 has a coupler 104 configured to combine an optical communication signal from section 102 with a pump wave generated by a pump-wave source 106 (e.g., a laser). Depending on the implementation of OPA 100, the pump wave may be a continuous-wave (CW) or pulsed optical signal. The combined signal is directed into a highly non-linear fiber (HNLF) 108, where the optical communication signal is amplified by way of parametric amplification. A filter 110 placed at the end of HNLF 108 separates the amplified optical communication signal (e.g., from the pump wave and an idler signal generated in HNLF 108) for further transmission in the communication system via section 102'.

One attractive feature of OPA 100 is that it can be designed to provide signal amplification at arbitrary wavelengths. In addition, OPA 100 can be configured to conjugate signals and/or change their wavelengths. However, one problem with OPA 100 is that the spectral width of its gain band may be relatively narrow. Also, the spectral shape of that band is typically not flat. One additional problem is that the intensity of the pump wave and therefore the gain in OPA 100 are limited by Brillouin scattering. These problems impede the use of OPAs in optical communication systems.

SUMMARY OF THE INVENTION

Certain embodiments of the present invention provide an optical parametric amplifier (OPA) driven with at least two pump waves. The pump waves may be configured such that the OPA produces uniform exponential gain over a range of wavelengths that extends, for example, at least 30 nm on either side of the average pump-wave wavelength. In addition, since the Brillouin scattering limit applies to each pump wave independently, substantially twice the amount of energy can be pumped into an OPA of the present invention compared to that in the corresponding single pump wave OPA of the prior art. An OPA of the present invention may be used in a WDM communication system and configured for simultaneous signal amplification and wavelength conversion.

According to one embodiment, the present invention is a device, comprising a nonlinear optical medium characterized by a zero-dispersion frequency, wherein the device is adapted to: (a) apply an input signal and at least two pump waves including a first pump wave and a second pump wave, to the nonlinear optical medium, wherein (i) spectral separation between the first and second pump waves is greater than about 10 nm, or (ii) frequencies of the first and second pump waves are asymmetrically offset with respect to the zero-dispersion frequency, or (iii) both (i) and (ii); and (b) generate an amplified output signal corresponding to the input signal by way of optical parametric amplification in the nonlinear optical medium, wherein the generation of the amplified output signal is based on an optical Kerr effect.

According to another embodiment, the present invention is a method of generating an optical signal, comprising: (a) applying an input signal and at least two pump waves including a first pump wave and a second pump wave, to a nonlinear optical medium characterized by a zero-dispersion frequency, wherein (i) spectral separation between the first and second pump waves is greater than about 10 nm, or (ii) frequencies of the first and second pump waves are asymmetrically offset with respect to the zero-dispersion frequency, or (iii) both (i) and (ii); and (b) generating an amplified output signal corresponding to the input signal by way of optical parametric amplification in the nonlinear optical medium, wherein the generation of the amplified optical signal is based on an optical Kerr effect.

According to yet another embodiment, the present invention is an optical amplifier, comprising: (a) a nonlinear optical medium characterized by a zero-dispersion frequency; (b) at least two optical pumps, each adapted to generate a pump wave; (c) one or more combiners adapted to apply the generated pump waves and an input signal to the nonlinear optical medium; and (d) an output filter coupled to the nonlinear optical medium and adapted to select an amplified output signal corresponding to the input signal from a plurality of signals present in the nonlinear optical medium, wherein: (i) spectral separation between first and second pump waves is greater than about 10 nm, or (ii) frequencies of the first and second pump waves are asymmetrically offset with respect to the zero-dispersion frequency, or (iii) both (i) and (ii); and the nonlinear optical medium is adapted to generate the amplified output signal by way of optical parametric amplification, wherein the generation of the amplified output signal is based on an optical Kerr effect.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
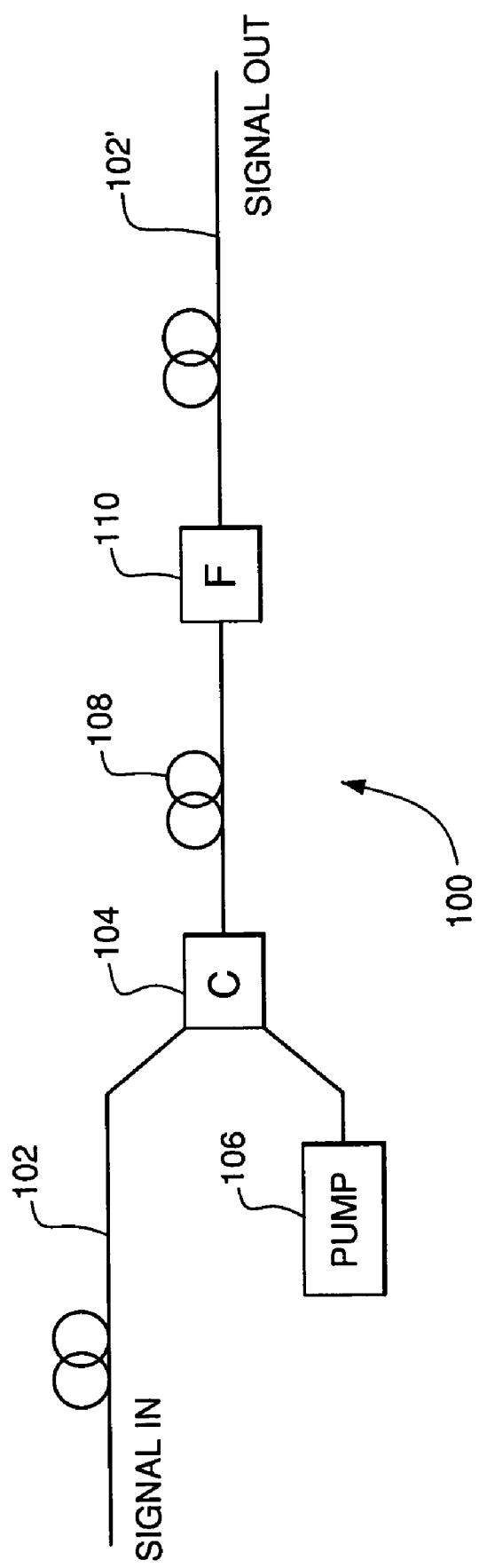
FIG. 1 shows a representative optical parametric amplifier (OPA) of the prior art as part of a long-haul transmission line in an optical communication system.

Before embodiments of the present invention are described in detail, different factors affecting the performance of prior art OPA 100 of FIG. 1 are briefly characterized.

Figure 2:
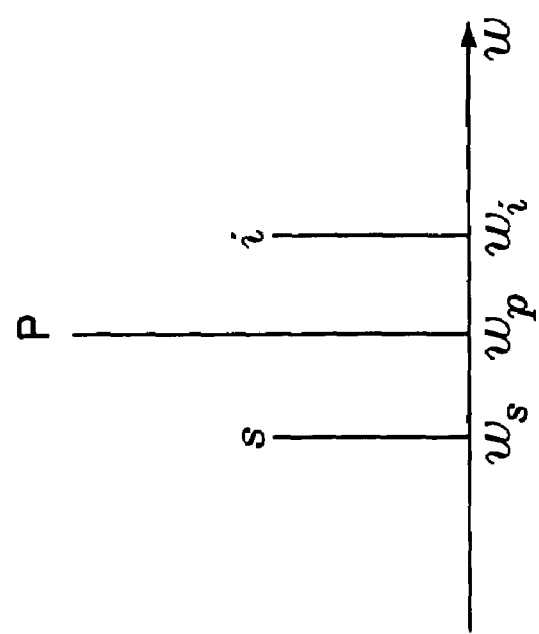
FIG. 2 illustrates the process of parametric amplification in the OPA of FIG. 1.

FIG. 2 illustrates the process of parametric amplification in OPA 100. Signal amplification in OPA 100 is governed by a degenerate four-wave mixing (FWM) process, in which two pump photons (labeled P in FIG. 2) combine to generate one signal photon and one idler photon (labeled s and i, respectively, in FIG. 2) according to the following equation:

$$2\omega_P = \omega_s + \omega_i \quad (1)$$

where $\omega_P$, $\omega_s$, and $\omega_i$ are the frequencies of the pump, signal, and idler photons, respectively. The nonlinear medium, in which the FWM process occurs (e.g., HNLF 108), is characterized by a nonlinearity coefficient ($\gamma$) and a set of dispersion coefficients. Of significance for this analysis are the second-, third-, and fourth-order dispersion coefficients ($\beta_2$, $\beta_3$, and $\beta_4$, respectively), each of which is frequency dependent. The frequency or wavelength at which $\beta_2=0$ is referred to as the zero-dispersion frequency ($\omega_0$) or wavelength ($\lambda_0$). The regions in which $\beta_2$ is positive and negative are referred to as the normal dispersion region and the anomalous dispersion region, respectively.

A review of the fundamentals of FWM can be found in a book by G. P. Agrawal, "Nonlinear Fiber Optics" (Third Edition), Academic Press, 2001, the teachings of which are incorporated herein by reference. In particular, on page 389 of his book, Agrawal states that FWM is an example of a parametric process. On page 390, Agrawal further states that FWM (i) has its physical origin in the third-order polarization phenomenon described by Eq. (10.1.1) and (ii) depends on the third-order susceptibility, $\chi^{(3)}$. On page 392, Agrawal states that signal amplification produced by FWM is referred to as parametric gain. On page 41, in Eqs. (2.3.7) and (2.3.8), Agrawal shows the relationship between $\chi^{(3)}$ and the dielectric constant (a square root of which gives the refractive index). One skilled in the art can readily conclude from these statements and equations that FWM can be equally described using either one of two alternative representations: (1) in terms of $\chi^{(3)}$ and (2) in terms of the nonlinear refractive index. The latter representation is adopted in this specification, with the linear refractive index expressed through the corresponding set of dispersion coefficients ($\beta_2$, $\beta_3$, and $\beta_4$).

On page 164 of his book, Agrawal further provides the nonlinear Schrodinger equation (Eq. (5.3.5)), upon which models of parametric amplification are based. The nonlinear term present in Eq. (5.3.5), $|u|^2 u$, has its physical origin in the third-order polarization phenomenon and is analogous to the term $\chi^{(3)}|E|^2 E$ of above-mentioned Eqs. (2.3.7) and (2.3.8), where u is a wave function and E is electric field. On page 165, Agrawal provides Eq. (5.3.6), in which the refractive index changes linearly with light intensity I (where $I \equiv |E|^2$) and states that "such a form of the refractive index is referred to as the Kerr nonlinearity." Then, Agrawal illustrates the connection between Eqs. (5.3.5) and (5.3.6) using Eqs. (5.3.7) and (5.3.8), which show that the nonlinear term in Eq. (5.3.5) can be directly attributed to the Kerr nonlinearity defined by Eq. (5.3.6). Thus, referring to "the Kerr nonlinearity" or to FWM based on a $\chi^{(3)}$ nonlinearity are just two alternative ways of describing the same physical phenomenon giving rise to parametric amplification in optical fibers. Nonlinear optical-wave generation caused by the Kerr nonlinearity is customarily referred to as an optical Kerr effect.

Figure 3:
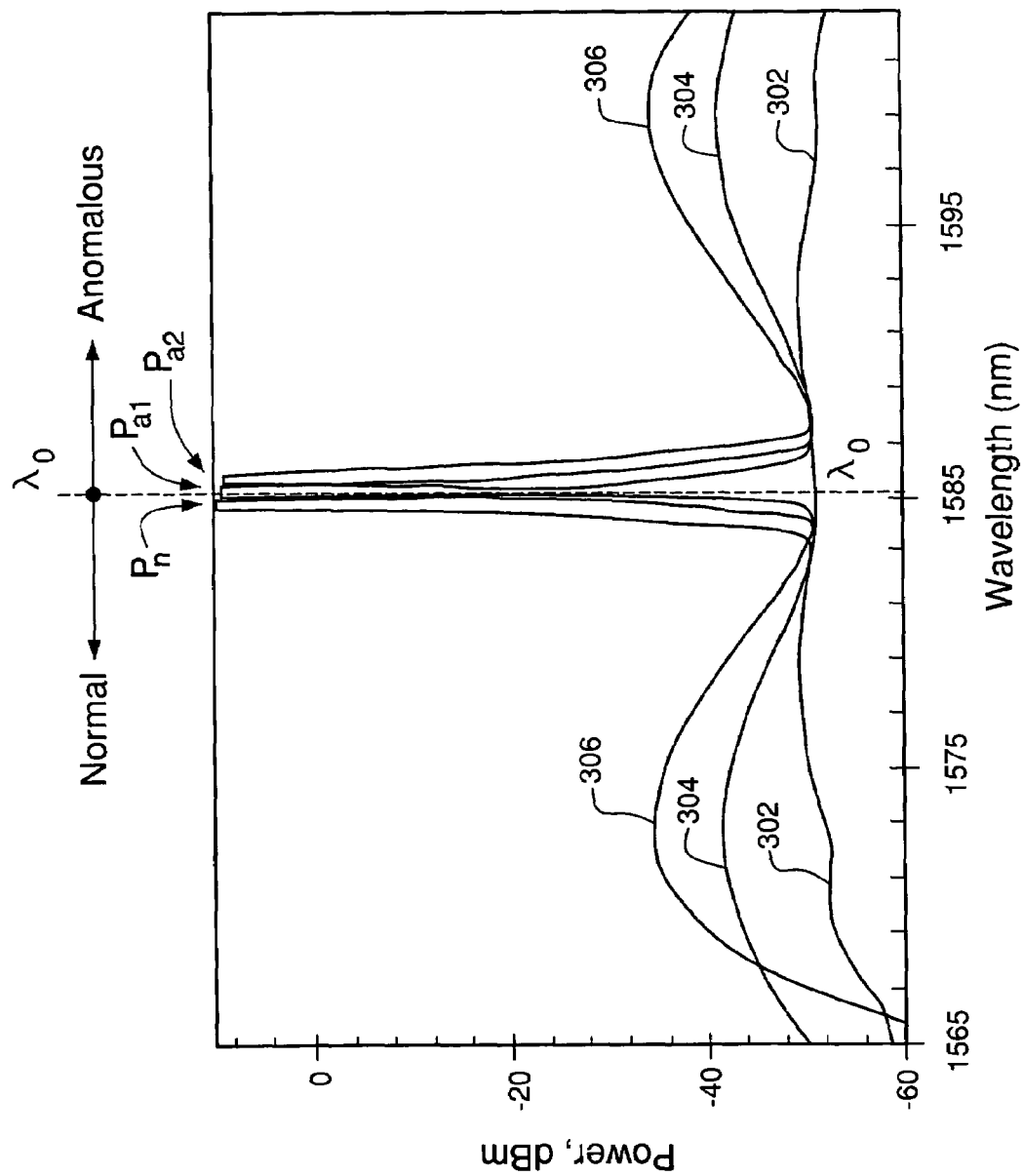
FIG. 3 illustrates the gain bands in the OPA of FIG. 1 as a function of the pump wave wavelength.

FIG. 3 illustrates representative gain bands in OPA 100 as a function of the pump wave wavelength. For the degenerate FWM process to occur, the wavelength of the pump wave should be in the anomalous dispersion region of HNLF 108. For example, when the wavelength of the pump wave is just inside the normal dispersion region, as for the pump wave labeled $P_n$ in FIG. 3, there is substantially no parametric gain, as can be seen from the corresponding gain curve labeled 302. On the other hand, when the wavelength of the pump wave is in the anomalous dispersion region, as for the pump waves labeled $P_{a1}$ and $P_{a2}$ in FIG. 3, the corresponding parametric gain bands develop, as can be seen from gain curves 304 and 306, respectively. However, the farther the pump wave wavelength is from the zero-dispersion wavelength, the narrower the corresponding gain bands become, as can be seen from the comparison of curves 304 and 306 in FIG. 3.

It is known in the art that the gain of OPA 100 depends on the intensity of the pump wave ($I_p$) and the length of HNLF 108. Depending on the relationship between the wave-vector mismatch coefficient ($\kappa$) in HNLF 108, $\gamma$, and $I_p$, OPA 100 can produce either exponential or quadratic gain (each determined by the functional dependence of gain on the length of HNLF 108. For example, if the intensity of the pump wave is chosen such that $\kappa = -\gamma I_p$, then the gain is relatively high and exponential. In contrast, if OPA 100 is designed such that $\kappa = 0$, then the gain is quadratic. Other values of $\kappa$ will correspond to a relatively low exponential gain.

Figure 4:
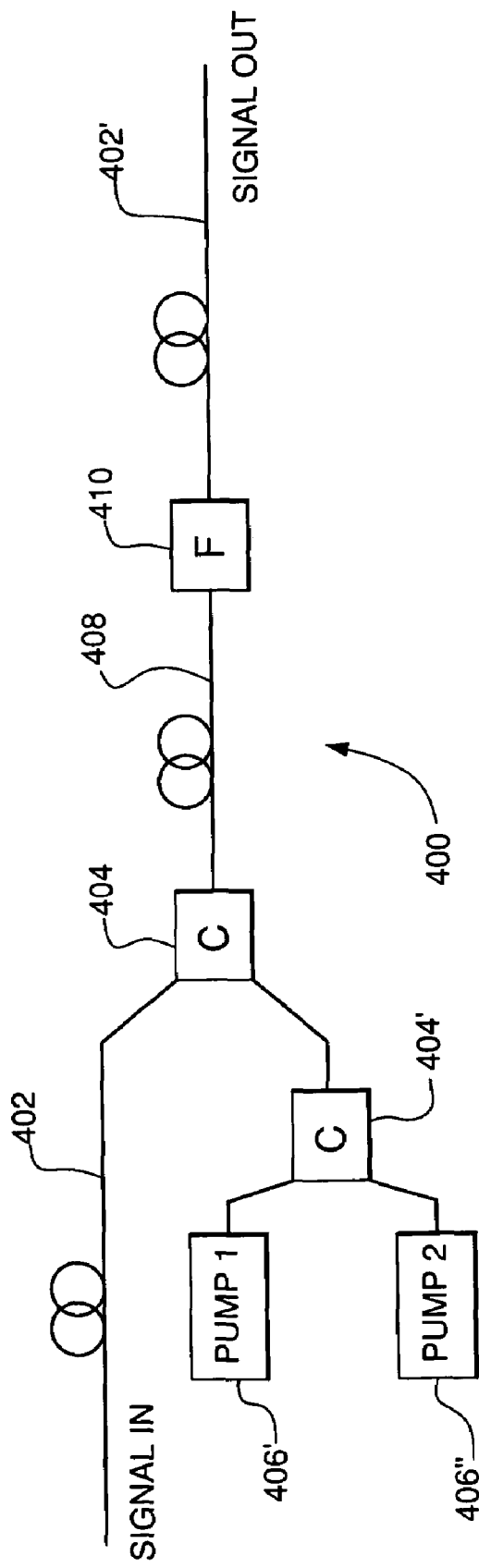
FIG. 4 shows an OPA according to one embodiment of the present invention.

FIG. 4 shows an OPA 400 according to one embodiment of the present invention. OPA 400 is similar to OPA 100 of FIG. 1. In particular, in FIG. 4, the components in OPA 400 analogous to those in OPA 100 are illustrated using labels having the same last two digits. However, one difference between OPA 400 and OPA 100 is that two different pump waves generated by two pump-wave sources 406' and 406" are used in OPA 400 to amplify an optical communication signal instead of one pump wave in OPA 100. The two pump waves are combined together using coupler 404' and further combined with the optical communication signal using coupler 404. Alternatively, a three-way coupler may be used to combine the optical communication signal with the two pump waves. Filter 410 extracts the amplified optical communication signal for transmission in the communication system.

Figure 5:
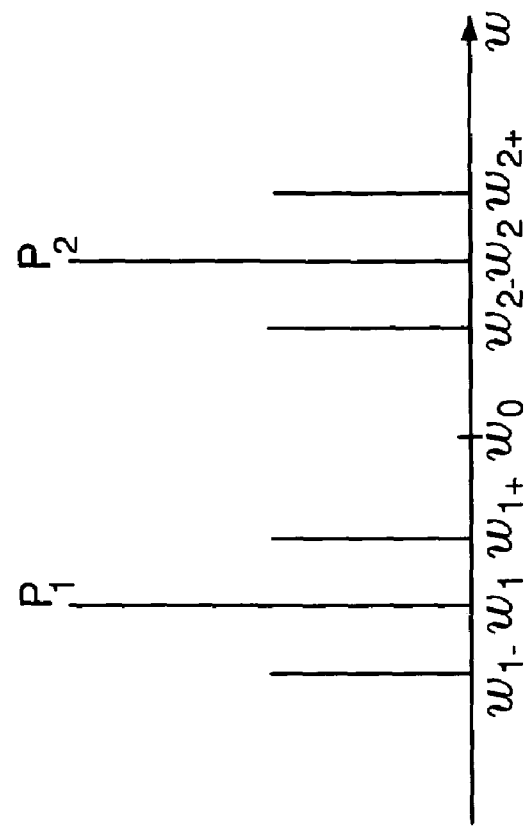
FIG. 5 illustrates a representative frequency structure in the OPA of FIG. 4.

FIG. 5 shows a simplified diagram of the frequency structure developed in HNLF 408 of OPA 400. In addition to two pump waves labeled $P_1$ and $P_2$ and located at frequencies $\omega_1$, and $\omega_2$, respectively, and an optical communication signal (illustratively a sideband at frequency $\omega_{1-}$), various FWM interactions in HNLF 408 produce three complementary sidebands at frequencies $\omega_{1+}$, $\omega_{2-}$, and $\omega_{2+}$. In general, the optical communication signal may correspond to any one of the four sidebands, with the remaining three sidebands being generated by FWM processes in OPA 400.

The following describes the FWM processes in OPA 400 leading to the frequency structure of FIG. 5. Assuming that the optical communication signal is at frequency $\omega_{1-}$ and the remaining three sidebands are idler sidebands, the modulational interaction (MI) produces a first idler sideband at frequency $\omega_{1+}$ according to Equation (2) as follows:

$$2\omega_1 = \omega_{1-} + \omega_{1+} \qquad (2)$$

a Bragg scattering (BS) process produces a second idler sideband at frequency $\omega_{2-}$ according to Equation (3) as follows:

$$\omega_1 + \omega_2 = \omega_{2-} + \omega_1 \qquad (3)$$

and a phase-conjugation (PC) process produces a third idler sideband at frequency $w_2+$ according to Equation (4) as follows:

$$\omega_1 + \omega_2 = \omega_{2+} + \omega_{1-} \qquad (4)$$

In addition, each of the three idler sidebands is coupled to the other two idler sidebands by an appropriate FWM process, i.e., MI, BS, or PC, that can be expressed by an equation analogous to Equations (2), (3), or (4).

In addition to the sidebands illustrated in FIG. 5, OPA 400 may also generate several additional sidebands (not shown). For example, MI with $P_2$ generates an additional sideband at frequency $2\omega_2 - \omega_1 + \delta\omega$, where $\delta\omega = \omega_1 - \omega_{1-}$. Also, a BS process with respect to $P_1$ generates another sideband at frequency $2\omega_1 - \omega_2 - \delta\omega$. Similarly, the sidebands at frequencies $\omega_{1+}$ and $\omega_{2-}$ are each coupled to additional sidebands at frequencies $2\omega_2 - \omega_1 - \delta\omega$ and $2\omega_1 - \omega_2 + \delta\omega$, and the sideband at frequency $\omega_{2+}$ is coupled to the aforementioned additional sidebands with frequencies $2\omega_{2-}\omega_1 + \delta\omega$ and $2\omega_1 - \omega_2 - \delta\omega$. However, unlike the four original sidebands shown in FIG. 5, each of which is coupled to each of the other three, none of the additional sidebands is coupled to all of the original four or all of the other three additional sidebands. Furthermore, for most values of $\delta\omega$, the additional sidebands are driven non-resonantly. Consequently, effects of the additional sidebands on the operation of OPA 400 are not considered here. Numerical simulations validate this omission.

Since OPA 400 relies on an optical Kerr effect and FWM for the generation of sidebands, the first and second pump waves ($P_1$ and $P_2$) are not required to be applied to HNLF 408 in a prescribed order; $\omega_1$ and $\omega_2$ are not required to be derived based on or have a specific relationship with the specific energy-level transitions of the material of HNLF 408; and/or the intensity of any of the first and second pump waves is not required to be above a level that produces electromagnetically induced transparency (EIT) in HNLF 408. These characteristics clearly distinguish OPA 400, e.g., from a nonlinear frequency generator disclosed by Harris, et al., in U.S. Pat. No. 5,771,117, the teachings of which are incorporated herein by reference. More specifically, for optical frequency generation, the generator of Harris relies on a strongly driven atomic local oscillator, which is prepared using the EIT phenomenon. Two pulsed pump beams (e.g., $B_1$ and $B_2$) are applied to the nonlinear optical medium (atomic gas) of the generator in a prescribed order and with a precisely defined time lag between the pulses. Pump beam $B_1$, which is applied first, has sufficient intensity to produce the EIT. After the nonlinear optical medium has been rendered transparent at the frequency of pump beam $B_2$ by the action of pump beam $B_1$, pump beam $B_2$ is applied to the nonlinear optical medium to create the desired strongly driven local oscillator state. If the pump beams $B_1$ and $B_2$ are applied in an order different from the prescribed order or with an incorrect time lag, the strongly driven local oscillator state might not be created, thereby rendering the generator of Harris inoperable.

Figure 6:
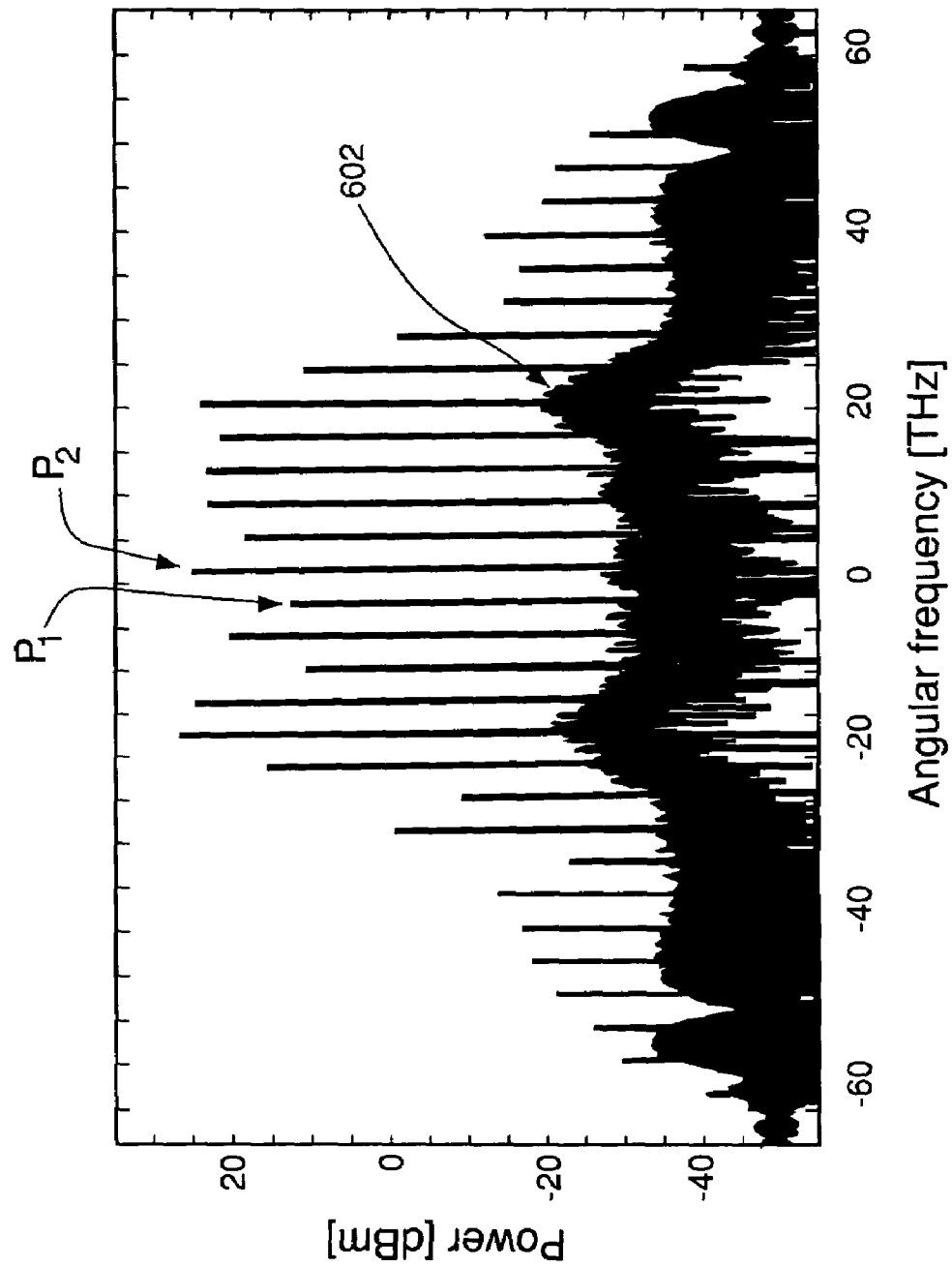
FIG. 6 illustrates generation of secondary pump waves in one configuration of the OPA of FIG. 4 via the pump-to-pump interaction.

FIG. 6 illustrates a process of secondary pump wave generation in OPA 400 via pump-to-pump FWM interaction. More specifically, FIG. 6 shows a representative frequency structure developed in HNLF 408 of OPA 400 when two pump waves are co-polarized and relatively closely spaced (e.g., have a separation of $|\omega_2 - \omega_1| < 8$ THz or $|\lambda_2 - \lambda_1| < 10$ nm). In particular, for the case shown in FIG. 6, $\omega_1 = -2.3$ THz and $\omega_2 = 1.5$ THz, where the frequencies are given relative to the zero-dispersion frequency in HNLF 408. As demonstrated by FIG. 6, the pump-to-pump FWM process leads to a progression of secondary pump waves separated from each other by 3.8 THz ($=\omega_2 - \omega_1$). In addition, the intensities ($I_i$) of the two original pump waves ($P_1$ and $P_2$ in FIG. 6) are altered from the initial input levels such that $I_1$ and $I_2$ are decreased by different amounts.

The background curve labeled 602 in FIG. 6 corresponds to the interaction of pump waves in OPA 400 with broadbandwidth noise. In the presence of an optical communication signal in OPA 400, background curve 602 would also correspond to the gain curve in OPA 400 for that particular OPA configuration. As can be seen in FIG. 6, on average, the gain level would be about 10–15 dB. However, generation of secondary pump waves is detrimental to the gain level produced by OPA 400 because the energy used for that process reduces the energy available for the intended signal amplification process. Also, various additional sidebands generated due to the complex secondary pump-wave frequency structure may interfere with the optical communication signal and/or its idlers. One possible way of overcoming these impediments is to use differently (e.g., orthogonally) polarized pump waves. A model that ignores the generation of secondary pump waves in the OPA configuration illustrated by FIG. 6 indicates that the gain level may be substantially increased.

Figure 7A:
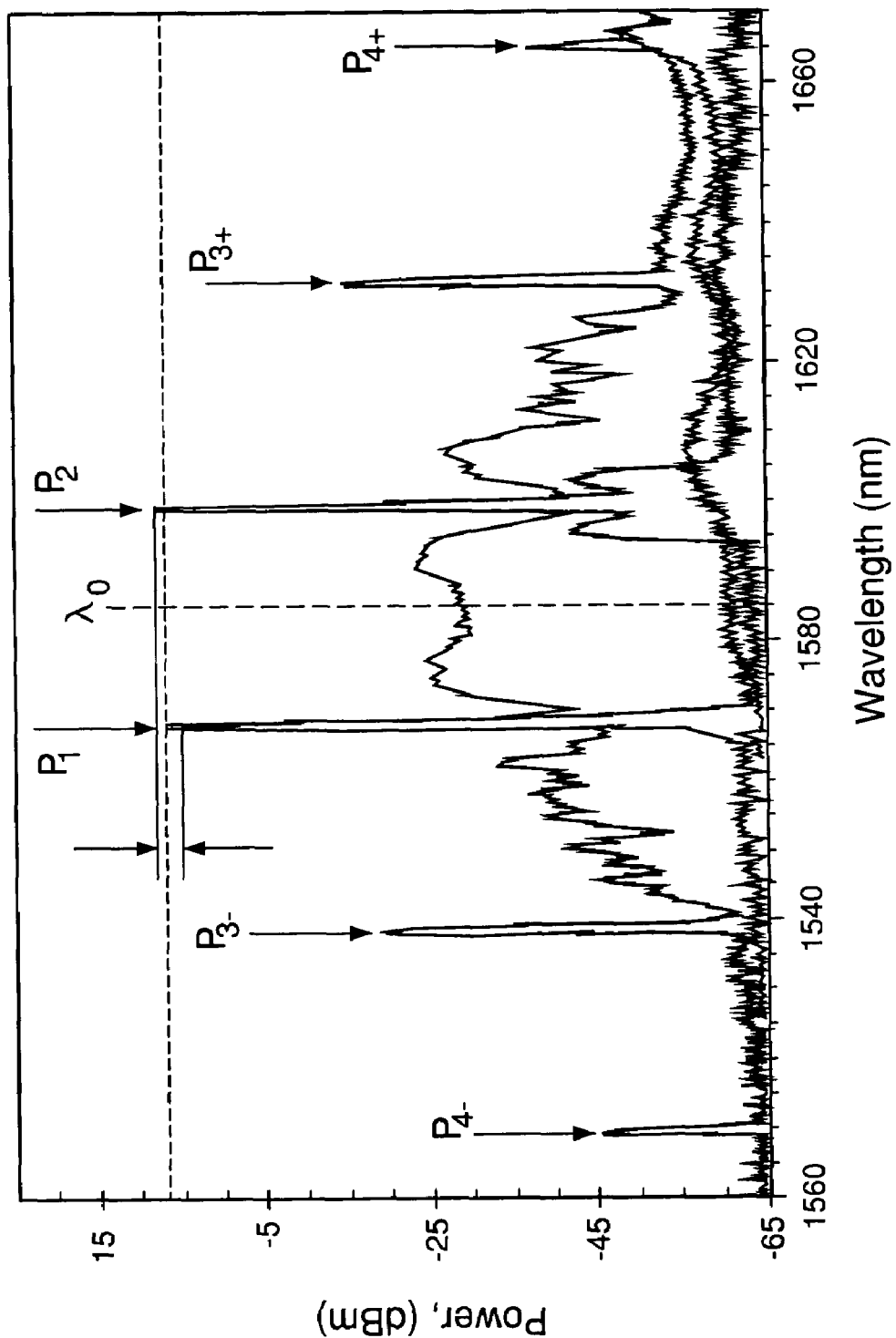
FIGS. 7A–B illustrate the behavior of the OPA of FIG. 4 driven by relatively widely spaced pump waves.
Figure 7B:
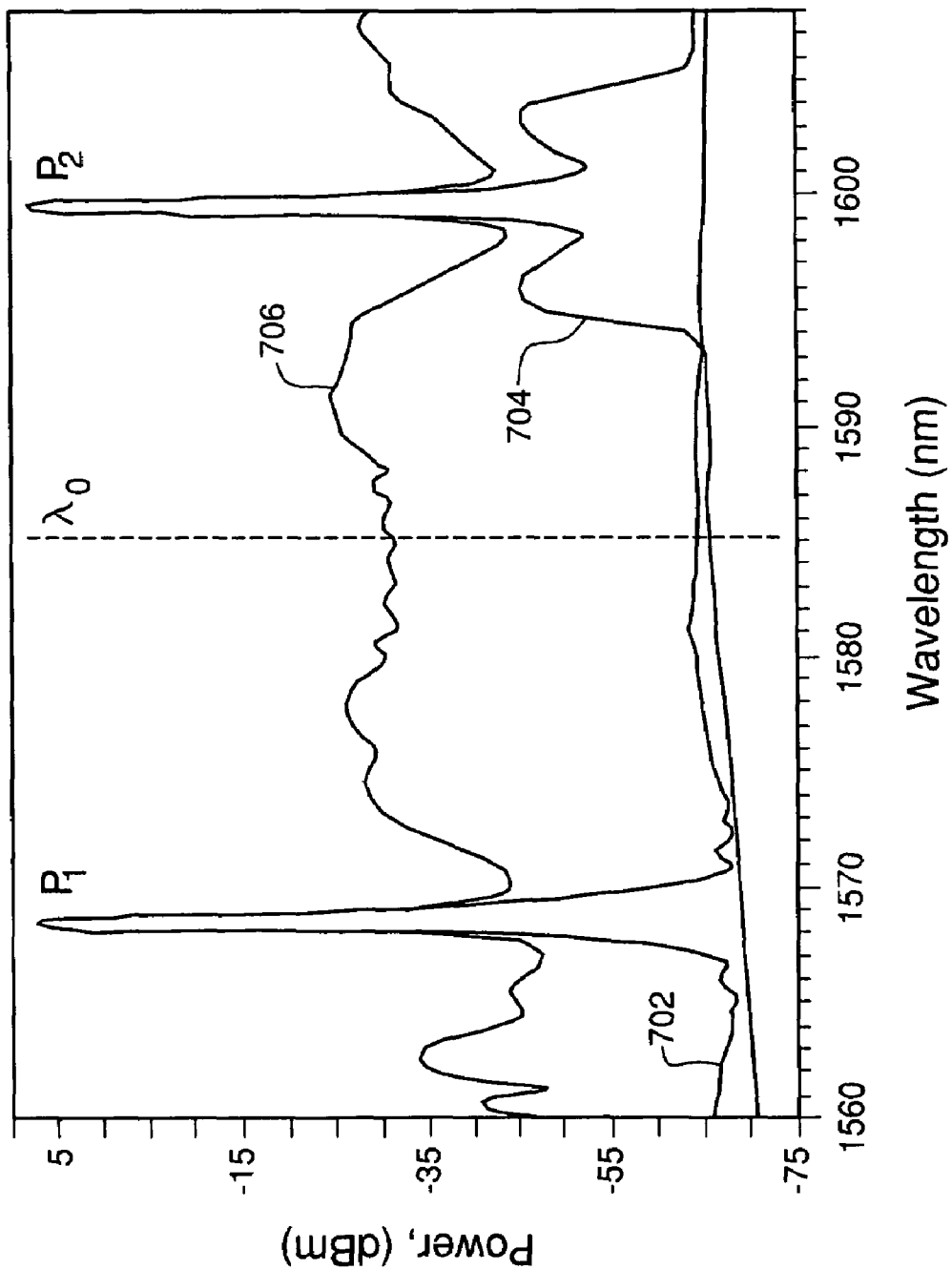

FIGS. 7A–B illustrate another way of reducing secondary pump wave generation and, also, a way of removing the generated secondary-pump frequencies from the ranges of signal and idler frequencies. More specifically, FIGS. 7A–B show the behavior of OPA 400 when two pump waves have a relatively wide separation (e.g., corresponding to $|\omega_2 - \omega_1| > 8$ THz or $|\lambda_2 - \lambda_1| > 10$ nm). In particular, for the case shown in FIGS. 7A–B, $\lambda_1 = 1568.7$ nm and $\lambda_2 = 1600.0$ nm, and the zero-dispersion wavelength in HNLF 408 is 1585.0 nm. FIG. 7A shows the OPA behavior in the spectral region between 1500 and 1670 nm and FIG. 7B is an expanded view of the data shown in FIG. 7A in the spectral region between 1560 and 1610 nm.

FIG. 7A shows that, in the case of widely spaced pump waves ($P_1$ and $P_2$ in FIG. 7A), the secondary pump waves ($P_{4-}$, $P_{3-}$, $P_{3+}$, and $P_{4+}$ in FIG. 7A) have relatively low intensities. More specifically, with respect to $P_1$ and $P_2$, the intensities of $P_{4-}$, $P_{3-}$, $P_{3+}$, and $P_{4+}$ are approximately −52 dB, −27 dB, −22 dB, and −47 dB, respectively. Consequently, the problems indicated above for the OPA configuration corresponding to FIG. 6 do not significantly affect the operation of OPA 400 configured according to FIG. 7.

Referring now to FIG. 7B, curve 702 is the gain curve of OPA 400 when $P_2$ is blocked and only $P_1$ is present. In agreement with the results of FIG. 3 (curve 302), curve 702 indicates no gain (because $\lambda_1$ is in the normal dispersion region of HNLF 408). Similarly, curve 704, which is the gain curve of OPA 400 when $P_1$ is blocked and only $P_2$ is present, indicates the presence of a relatively narrow gain band that is analogous to, e.g., curve 306 in FIG. 3. Finally, curve 706 is the gain curve of OPA 400 when both pump waves, $P_1$ and $P_2$, are present. The comparison of curves 704 and 706 indicates that an OPA driven with two pump waves produces a higher gain level than the corresponding OPA driven by a single pump wave. In addition, the available spectral bandwidth is significantly wider than that achieved in the single pump-wave OPA. Also, the spectral gain profile is relatively flat.

Similar to OPA 100, the gain in OPA 400 depends on the intensity of the pump waves and the length of HNLF 408. However, in OPA 400, the gain remains exponential even when $\kappa=0$. Furthermore, since the Brillouin scattering limit applies to each pump wave independently, substantially twice the amount of energy may be pumped into OPA 400 compared to that in OPA 100 possibly resulting in further gain increase.

Figure 8B:
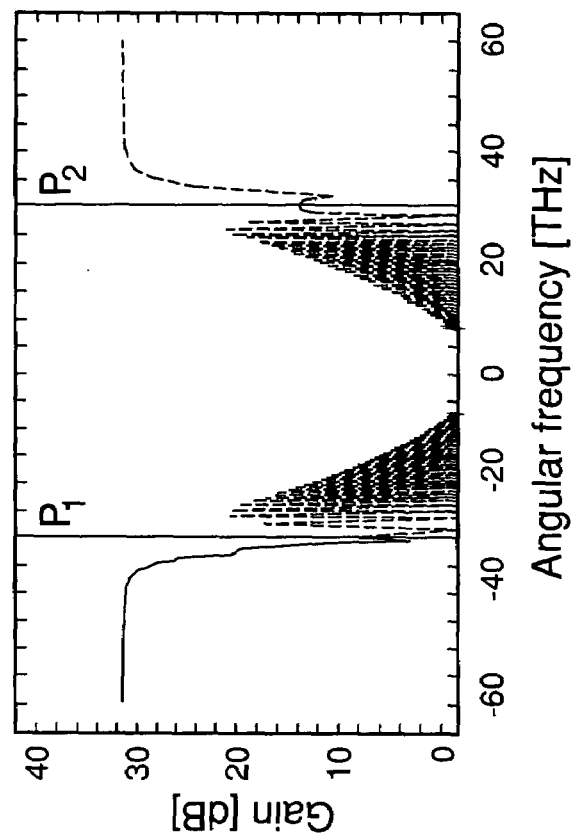
FIGS. 8A–D illustrate the effect of fiber properties and pump waves configuration on the operation of the OPA of FIG. 4.
Figure 8A:
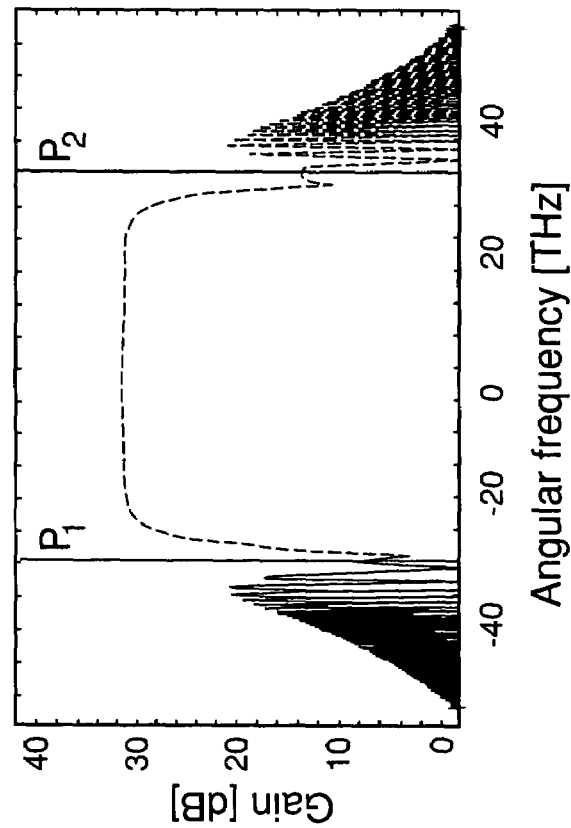

FIGS. 8A–D illustrate the effects of fiber (i.e., HNLF 408) properties and configuration of pump waves on the operation of OPA 400. In particular, FIG. 8A shows the gain curve for an OPA configuration in which: $\beta_3=0.12$ ps$^3$/km; $\beta_4=0$; $\omega_1=-30$ THz; and $\omega_2=30$ THz, where the pump-wave frequencies are measured with respect to the zero-dispersion frequency in HNLF 408 and the values of dispersion coefficients are given at the average pump-wave frequency (defined as $\omega_a=(\omega_1+\omega_2)/2$). As can be seen in FIG. 8A, this configuration produces a gain level of about 30 dB for optical communication signals with frequencies, e.g., between −25 and 0 THz. Similarly, FIG. 8B shows that a comparable gain level is obtained using the configuration of FIG. 8A for optical communication signals whose frequencies are, e.g., below −35 THz.

Figure 8D:
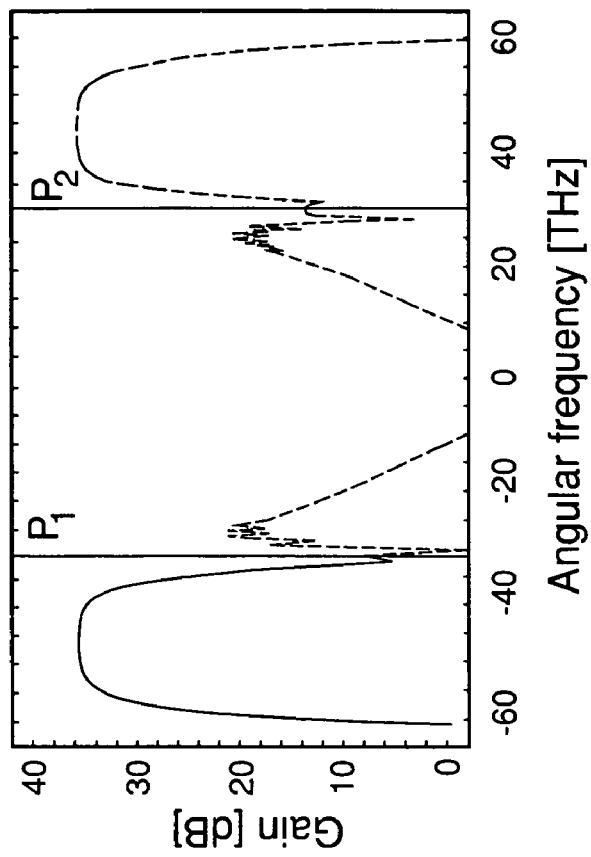
Figure 8C:
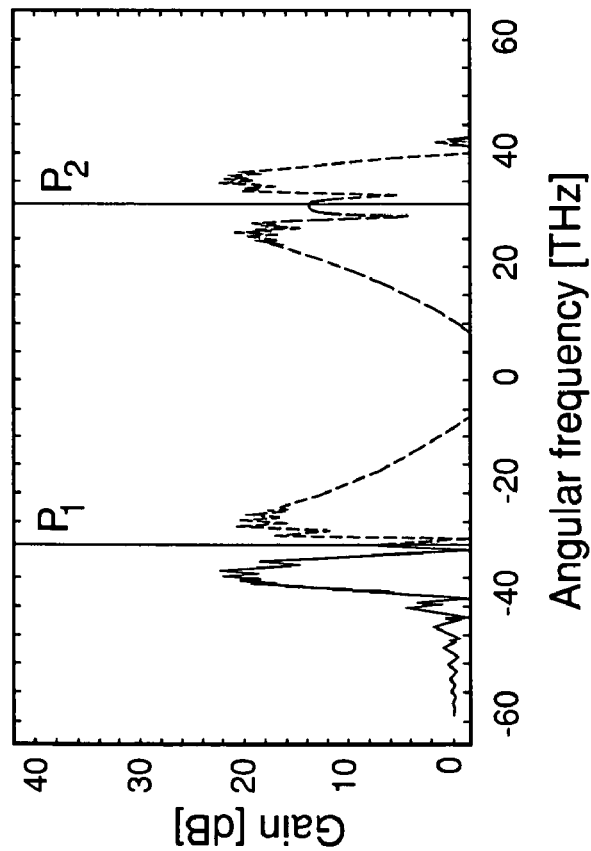

FIG. 8C illustrates possible behavior of OPA 400 when $\beta_4 \neq 0$. In particular, FIG. 8C shows the gain curve for the OPA configuration in which all the parameters are the same as for FIG. 8B, except that $\beta_4=2.5 \times 10^{-4}$ ps$^4$/km. The results of FIG. 8C indicate that the parametric gain (e.g., characterized by the available gain level and bandwidth) may be adversely affected by the effects of fourth-order dispersion.

FIG. 8D illustrates that the effects of fourth-order dispersion may be partially offset, e.g., by detuning one of the pump waves from the symmetrical configuration of FIGS. 8A–C. In particular, FIG. 8D shows the gain curve for the configuration in which all the parameters are the same as for FIG. 8C, except that $\omega_1=-31.4$ THz instead of −30 THz. As seen in FIG. 8D, this particular configuration produces a gain level of about 35 dB for optical communication signals with frequencies, e.g., between −55 and −35 THz.

Figures 9, 10:
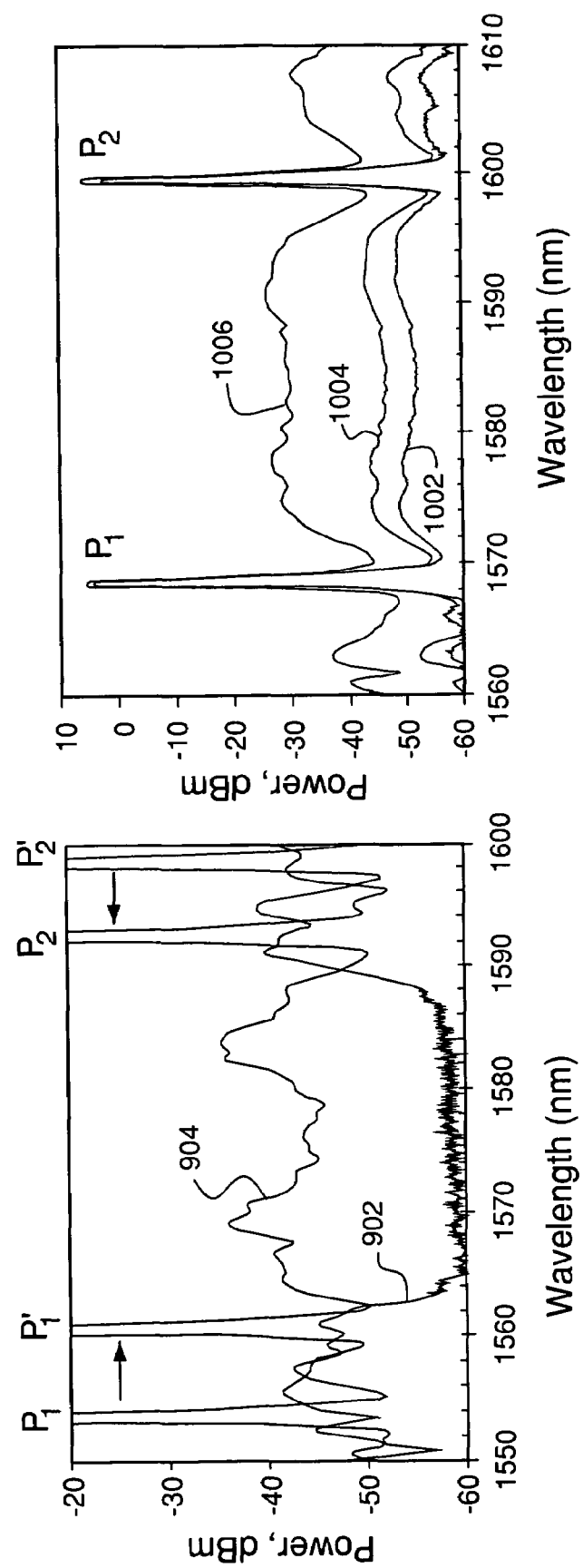
FIG. 9 illustrates how the spectral characteristics of the OPA of FIG. 4 may be changed by tuning the frequencies of pump waves.
FIG. 10 illustrates how the gain level of the OPA of FIG. 4 is affected by the intensities of pump waves.

FIG. 9 illustrates how the spectral gain profile of OPA 400 may be varied by tuning the frequencies of pump waves. For example, curve 902 is the gain curve of OPA 400 in which $\lambda_1=1553.9$ nm and $\lambda_2=1598.8$ nm. As seen in FIG. 9, this configuration exhibits a region of low gain between about 1563 and 1588 nm. However, when the pump waves are tuned to $\lambda_1'=1560.9$ nm and $\lambda_2'=1592.8$ nm, respectively, a relatively high gain level is obtained in that region as shown by curve 904.

FIG. 10 illustrates how the gain of OPA 400 is affected by the intensities of pump waves. More specifically, curves 1002, 1004, and 1006 in FIG. 10 are the gain curves corresponding to different pump-wave intensities in OPA 400 in which $\lambda_1=1568.9$ nm and $\lambda_2=1598.8$ nm. Curve 1002 corresponds to $I_1=189$ mW and $I_2=85$ mW; curve 1004 corresponds to $I_1=220$ mW and $I_2=107$ mW; and curve 1006 corresponds to $I_1=380$ mW and $I_2=178$ mW. The results of FIG. 10 indicate that the performance of OPA 400 is characterized by gain equalization over a wide wavelength range even when the OPA is driven by pump waves whose intensities are substantially different. As a result, OPA 400 may be configured for applications previously considered impractical with prior art OPAs as further described below.

Figure 11A:
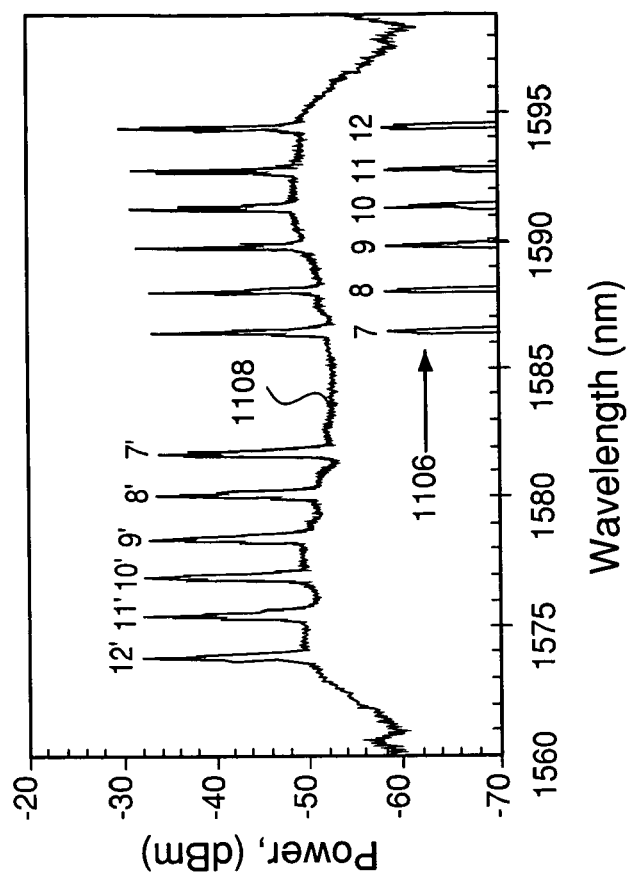
FIGS. 11A–B illustrate simultaneous amplification and wavelength conversion of a wavelength-division-multiplexed (WDM) optical communication signal using the OPA of FIG. 4.
Figure 11B:
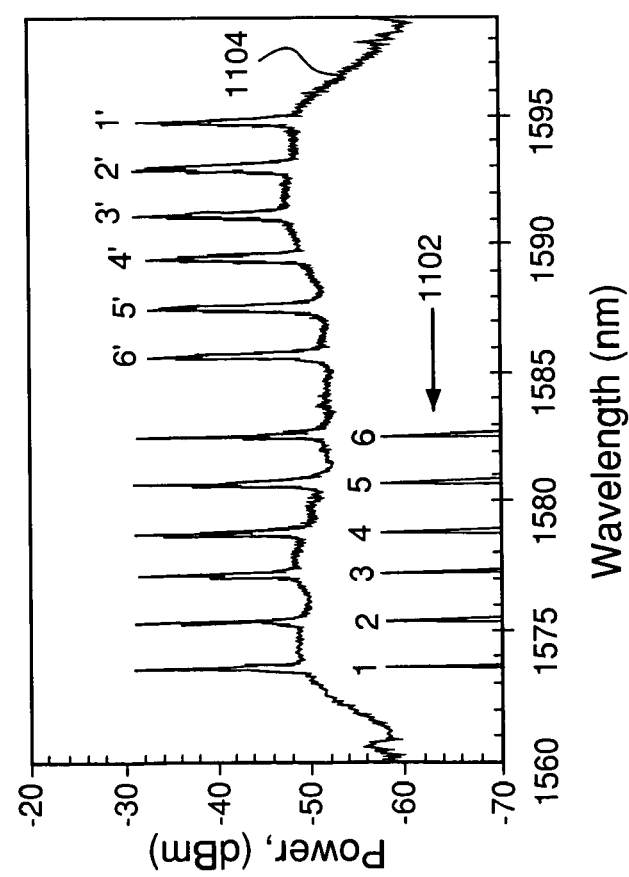

FIGS. 11A–B illustrate simultaneous amplification and wavelength conversion (mirroring) of a wavelength-division-multiplexed (WDM) optical communication signal using OPA 400. More specifically, FIGS. 11A and 11B illustrate wavelength up- and down-conversion, respectively. In particular, a representative WDM signal 1102 shown in FIG. 11A comprises six WDM components (channels) labeled 1 through 6. An amplified signal 1104, also shown in FIG. 11A, includes the corresponding amplified components 1 through 6. However, in addition to those components, signal 1104 also includes the amplified red-shifted components labeled 1' through 6'. The primed components are idlers of the corresponding unprimed components and therefore carry the same information. Consequently, one or more of the primed components may be used to generate a new WDM signal corresponding to signal 1102 and employing a different set of wavelengths. For example, the new WDM signal carrying the same information as signal 1102 may have the following components: 1, 2', 3, 4', 5, and 6'. Similarly, FIG. 11B illustrates the generation of the blue-shifted primed components labeled 7' through 12' in an amplified signal 1108, which correspond to components 7 through 12, respectively, of a WDM signal 1106. Consequently, one or more of those primed components may also be used to generate a new WDM signal corresponding to signal 1106 and having a different set of wavelengths.

While this invention has been described with reference to illustrative embodiments, this description is not intended to be construed in a limiting sense. For example, in different OPA implementations, optical fibers having different properties (e.g., $\beta_2$, $\beta_3$, and $\beta_4$) may be used. Also, an OPA may be configured such that the average pump-wave frequency ($\omega_a$) is either in the anomalous dispersion region or the normal dispersion region, or corresponds to the zero-dispersion frequency ($\omega_0$). In addition, both pump waves may be in the anomalous dispersion region. Although, the representative OPA configurations described in this specification have a pump-wave separation of up to about 75 nm (or 60 THz), configurations with separations of up to about 150 nm were successfully implemented, and even higher pump-wave separations may be used. The pump waves may be CW or pulsed. Two or more pump waves may be used. The frequencies of the pump waves may be chosen such that (i)

one frequency falls within the normal dispersion region and one frequency falls within the anomalous dispersion region; or (ii) two frequencies fall within the anomalous dispersion region. Idler components may be filtered out or used in the communication system, e.g., as a protection signal in a 1+1 protection scheme. Pump-wave frequencies may be dithered, as known in the art, to reduce the effects of Brillouin scattering. Furthermore, the two pump waves may be dithered such that the average frequency remains constant, e.g., as disclosed in U.S. Pat. No. 5,386,314, the teachings of which are incorporated herein by reference. As a result, idler frequencies will not be time-dependent and the corresponding idler bands will not be broadened. This is advantageously different from an OPA driven by a single pump wave, in which the pump-wave dithering causes the idler frequencies to be time-dependent and the corresponding idler bands to be broadened. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A device, comprising a nonlinear optical medium characterized by a zero-dispersion frequency, wherein the device is adapted to:
   apply an input signal and at least two pump waves including a first pump wave and a second pump wave, to the nonlinear optical medium, wherein (i) spectral separation between the first and second pump waves is greater than about 10 nm, or (ii) frequencies of the first and second pump waves are asymmetrically offset with respect to the zero-dispersion frequency, or (iii) both (i) and (ii); and
   generate an amplified output signal corresponding to the input signal by way of optical parametric amplification in the nonlinear optical medium, wherein the generation of the amplified output signal is based on an optical Kerr effect.

2. The invention of claim 1, wherein the spectral separation between the first and second pump waves is greater than about 10 nm.

3. The invention of claim 2, wherein the spectral separation between the first and second pump waves is smaller than about 60 nm.

4. The invention of claim 1, wherein the frequencies of the first and second pump waves are asymmetrically offset with respect to the zero-dispersion frequency.

5. The invention of claim 1, wherein the first and second pump waves have one or more characteristics that inhibit secondary pump-wave generation.

6. The invention of claim 1, wherein the frequency of the first pump wave falls within the anomalous dispersion region of the nonlinear optical medium and the frequency of the second pump wave falls within the normal dispersion region of the nonlinear optical medium.

7. The invention of claim 1, wherein the average pump-wave frequency falls within an anomalous dispersion region of the nonlinear optical medium.

8. The invention of claim 7, wherein the frequencies of the first and second pump waves fall within the anomalous dispersion region of the nonlinear optical medium.

9. The invention of claim 1, wherein:
   the frequency of the first pump wave falls within a normal dispersion region of the nonlinear optical medium; and
   the frequency of the second pump wave falls within an anomalous dispersion region of the nonlinear optical medium.

10. The invention of claim 1, wherein:
    the input signal is a wavelength-division-multiplexed signal comprising a plurality of input channel signals; and
    the device is adapted to generate a plurality of amplified output channel signals corresponding to said input channel signals.

11. The invention of claim 1, further comprising:
    at least two optical pumps, each adapted to generate a pump wave, wherein the generated pump waves include the at least two pump waves; and
    one or more combiners adapted to apply the generated pump waves and the input signal to the nonlinear optical medium.

12. The invention of claim 11, wherein the at least two optical pumps are adapted to tune at least one of the first and second pump waves to change the pump-wave frequency or intensity.

13. The invention of claim 1, wherein:
    the device is adapted to generate one or more idler signals and amplify the input signal in the nonlinear optical medium; and
    the device comprises an output filter adapted to select the amplified output signal from the amplified input signal and the one or more idler signals.

14. The invention of claim 1, wherein:
    the first and second pump waves are not required to be applied to the nonlinear optical medium in a prescribed order; and
    the frequencies of the first and second pump waves are not required to have a specific relationship with certain energy-level transitions of the nonlinear optical medium.

15. A method of generating an optical signal, comprising:
    (a) applying an input signal and at least two pump waves including a first pump wave and a second pump wave, to a nonlinear optical medium characterized by a zero-dispersion frequency, wherein (i) spectral separation between the first and second pump waves is greater than about 10 nm, or (ii) frequencies of the first and second pump waves are asymmetrically offset with respect to the zero-dispersion frequency, or (iii) both (i) and (ii); and
    (b) generating an amplified output signal corresponding to the input signal by way of optical parametric amplification in the nonlinear optical medium, wherein the generation of the amplified optical signal is based on an optical Kerr effect.

16. The invention of claim 15, wherein step (a) comprises tuning at least one of the first and second pump waves to change the pump-wave frequency or intensity.

17. The invention of claim 15, wherein step (b) comprises:
    generating one or more idler signals and amplifying the input signal in the nonlinear optical medium; and
    selecting the amplified output signal from the amplified input signal and the one or more idler signals.

18. The invention of claim 15, wherein:

the first and second pump waves are not required to be applied to the nonlinear optical medium in a prescribed order; and the frequencies of the first and second pump waves are not required to have a specific relationship with certain energy-level transitions of the nonlinear optical medium.

19. An optical amplifier, comprising:

a nonlinear optical medium characterized by a zero-dispersion frequency;

at least two optical pumps, each adapted to generate a pump wave;

one or more combiners adapted to apply the generated pump waves and an input signal to the nonlinear optical medium; and an output filter coupled to the nonlinear optical medium and adapted to select an amplified output signal corresponding to the input signal from a plurality of signals present in the nonlinear optical medium, wherein:

(i) spectral separation between first and second pump waves is greater than about 10 nm, or (ii) frequencies of the first and second pump waves are asymmetrically offset with respect to the zero-dispersion frequency, or (iii) both (i) and (ii); and the nonlinear optical medium is adapted to generate the amplified output signal by way of optical parametric amplification, wherein the generation of the amplified output signal is based on an optical Kerr effect.

20. The invention of claim 19, wherein:

the nonlinear optical medium is adapted to generate one or more idler signals and amplify the input signal; and the output filter is adapted to select the amplified output signal from the amplified input signal and the one or more idler signals.

* * * * *